F. H. VAN HOUTEN.
MACHINE FOR ROUNDING UP LUMPS OF DOUGH.
APPLICATION FILED FEB. 2, 1916.
1,244,801. Patented Oct. 30, 1917.
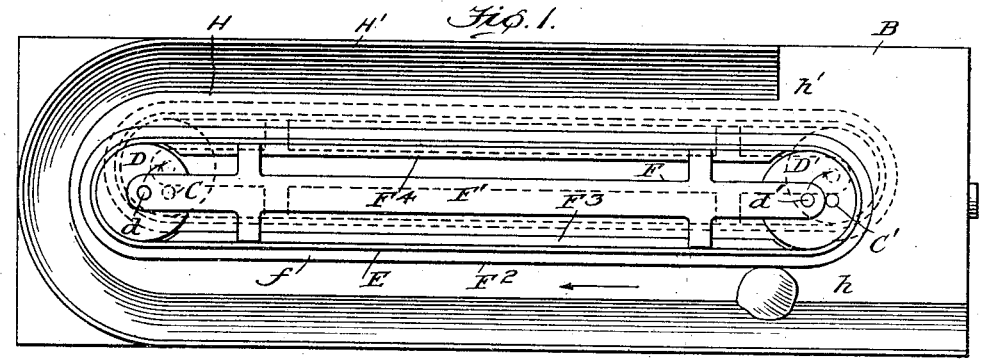
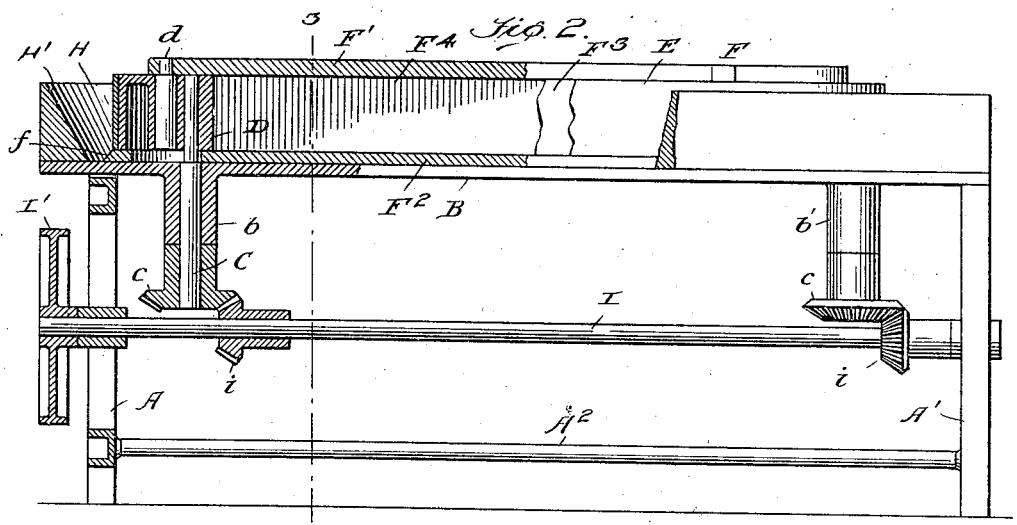
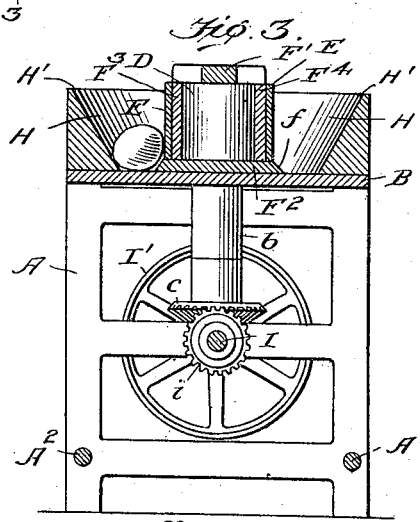

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

MACHINE FOR ROUNDING UP LUMPS OF DOUGH.

1,244,801.      Specification of Letters Patent.      Patented Oct. 30, 1917.

Application filed February 2, 1916. Serial No. 75,698.

*To all whom it may concern:*

Be it known that I, FRANK H. VAN HOUTEN, a citizen of the United States, residing at Beacon, in the county of Dutchess and State of New York, have invented certain new and useful Improvements in Machines for Rounding Up Lumps of Dough; and I do hereby declare the following to be a full, clear, and exact description of the same, reference being had to the accompanying drawings, forming part of this specification.

This invention relates to a machine for rounding up, kneading and giving a surface finish to lumps of dough preparatory to the proofing and baking of the same to make bread.

The primary object of the invention is to provide an exceedingly simple and efficient machine of the above type, which will effectually perform the rounding up and finishing operations as a practically continuous process, whereby a succession or series of lumps of dough may be simultaneously treated and progressed through the machine, one lump after the other.

The invention consists in the construction, arrangement and combinations of parts, as will be described in the following specification, the novel features being pointed out in the claims at the end of the specification.

In the accompanying drawings:—

Figure 1 is a top plan view of a machine embodying the present improvements.

Fig. 2 is a side elevation, partly in longitudinal vertical section, of the same.

Fig. 3 is a transverse vertical section on the line 3—3 of Fig. 2.

Like characters of reference in the several figures indicate the same parts.

The base frame of the machine is illustrated as of conventional form, consisting of the end uprights A, A' braced by longitudinal connecting bars A². Supported by the uprights A, A' is a top board or table B upon which the dough engaging parts of the present invention are mounted.

Near its opposite ends, the table B is provided with depending bearing sleeves b, b', in which are journaled vertical spindles or shafts C, C'. Mounted on the upper ends of the respective spindles C, C' are pulleys D, D', each pulley being eccentrically mounted on its spindle, as shown in Figs. 1 and 2. These pulleys support the opposite ends of an endless belt E, which forms the movable dough-molding surface of the machine. At the centers of the respective pulleys D, D' are spindles d, d' which support a frame F consisting of an upper horizontal skeleton member F', a base F² upon which the pulleys rest, and vertical plates F³ and F⁴ connecting the skeleton member and the base and located on each side of the frame. The vertical plates F³, F⁴ are between the pulleys D, D' and form a backing for the moving belt E. The outer edge of the base F' is beveled, as shown at f, said base sliding over the upper surface of the table B during the movement of the belt and frame as a body and preventing dough on the table from working between the belt and table.

The stationary dough-molding surface of the present invention is preferably embodied in a stationary trough H extending around one end of the belt E and having its opposing dough-molding surface H' spaced from the outer dough-engaging surface of the belt, whereby lumps of dough may be positioned between the trough and belt and rolled along the surface of the trough when the belt is brought into contact with them. Preferably, the surface H' of the trough is inclined at an angle away from the belt, and one end of the trough left open to facilitate feeding and discharge of the lumps of dough.

Each vertical spindle C, C' is provided with a gear c, the gear c being in mesh with driving pinions i on a longitudinal drive shaft I. Drive shaft I is journaled at its opposite ends in suitable bearings in the uprights A, A' of the frame work and is provided with a suitable pulley I', whereby drive shaft I may be connected with any suitable power source, not shown.

With the arrangement above described, if shaft I is set in motion, a lump of dough placed between the belt E and the dough-molding surface H' of the trough at the inlet h will be caused to advance along the trough H by the continuous forward movement of the dough-engaging surface of the belt. The eccentricity of the axes of rotation of the pulleys D, D' causes the belt frame F and pulleys to move in unison bodily in a substantially elliptical path. As a result, the belt is intermittently forced into contact with the lumps of dough positioned between it and the trough H, so that the lumps are intermittently progressed and rolled along the trough by the moving surface of the belt. The bodily lateral movement of the belt squeezes the lumps of dough against the molding surface H' of the trough and the continuous forward movement of the belt carries the lumps along the trough rolling them against its surface. The lumps of dough are progressed around the trough and discharged at the point h'. This operation will impart to the lumps of dough a surface finish and will, because of the squeezing of the lumps against the surface of the stationary trough and the rolling movement, knead the dough.

What is claimed is:

1. A dough rounding up machine comprising, a stationary dough-molding surface, a continuously movable endless belt coöperable with said stationary dough-molding surface, and means for moving the belt bodily in a substantially elliptical path whereby lumps of dough interposed between the stationary dough-molding surface and the belt may be alternately pressed and released by said belt.

2. A dough rounding up machine comprising, a stationary dough-molding surface, a continuously movable endless belt coöperable with said stationary dough-molding surface and arranged at an angle with respect to the latter, and means for moving the belt bodily in a substantially elliptical path, whereby lumps of dough interposed between the stationary dough-molding surface and the belt may be alternately pressed and released by said belt.

3. In a machine for rounding up lumps of dough, the combination with the table, of a stationary dough-molding surface on the table, an endless belt arranged in opposition to said dough molding surface whereby lumps of dough may be positioned between the belt and the dough-molding surface, and driving mechanism for imparting a continuous forward movement to the belt and for moving the belt bodily in a substantially elliptical path, whereby the lumps of dough are intermittently brought into contact with the moving dough engaging surface of the belt.

4. In a machine for rounding up lumps of dough, the combination with the table, of an endless dough engaging belt on said table, a stationary dough-molding trough extending around one end of the belt and arranged in opposition to the dough-engaging surface of the belt, and driving mechanism for imparting a continuous forward movement to the belt and for moving the belt bodily in a substantially elliptical path.

5. In a machine for rounding up lumps of dough, the combination with the table, of a stationary dough-molding surface on the table, an endless belt arranged in opposition to said dough-molding surface whereby lumps of dough may be positioned between the belt and the dough-molding surface, pulleys supporting the opposite ends of the belt, each pulley having an eccentric axis of rotation, and gearing connections for imparting continuous rotary movement to said pulleys about their eccentric axes.

6. In a machine for rounding up lumps of dough, the combination with the table, of a stationary dough-molding surface on the table, an endless belt arranged in opposition to said dough molding surface whereby lumps of dough may be positioned between the belt and the dough molding surface, pulleys supporting the opposite ends of the belt, a frame supported at its ends on the central axes of the respective pulleys, each pulley having an eccentric axis of rotation, and gearing connections for imparting continuous rotary movement to said pulleys about their eccentric axes.

FRANK H. VAN HOUTEN.

Copies of this patent may be obtained for five cents each, by addressing the "Commissioner of Patents, Washington, D. C."